US011055075B2

(12) United States Patent
Lee (10) Patent No.: US 11,055,075 B2
(45) Date of Patent: Jul. 6, 2021

(54) USER TERMINAL DEVICE, SERVER, AND APPLICATION EXECUTION METHOD THEREOF

(71) Applicant: Samsung Electronics Co., Ltd., Suwon-si (KR)

(72) Inventor: Sang gyu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 15/778,443

(22) PCT Filed: Mar. 15, 2016

(86) PCT No.: PCT/KR2016/002588
§ 371 (c)(1),
(2) Date: May 23, 2018

(87) PCT Pub. No.: WO2017/104902
PCT Pub. Date: Jun. 22, 2017

(65) Prior Publication Data
US 2018/0349116 A1    Dec. 6, 2018

(30) Foreign Application Priority Data

Dec. 15, 2015 (KR) .................. 10-2015-0179590

(51) Int. Cl.
*G06F 8/41* (2018.01)
*G06F 9/44* (2018.01)
*G06F 9/455* (2018.01)

(52) U.S. Cl.
CPC ............ *G06F 8/44* (2013.01); *G06F 8/443* (2013.01); *G06F 9/44* (2013.01); *G06F 9/4552* (2013.01)

(58) Field of Classification Search
CPC ... G06F 8/44; G06F 8/443; G06F 9/44; G06F 9/4552
(Continued)

(56) References Cited

U.S. PATENT DOCUMENTS 6,631,515 B1 * 10/2003 Berstis ................ G06F 9/45516
717/140
6,851,106 B1 * 2/2005 Narisawa .................. G06F 8/24
717/108
(Continued)

FOREIGN PATENT DOCUMENTS

JP    2003-216434 A    7/2003
JP    2003-316583 A    11/2003
(Continued)

OTHER PUBLICATIONS

Puder, "Cross-Compiling Android Applications to the iPhone", [Online], 2010, pp. 69-77, [Retrieved from internet on Feb. 9, 2021], <https://dl.acm.org/doi/pdf/10.1145/1852761.1852772> (Year: 2010).*

(Continued)

*Primary Examiner* — S. Sough
*Assistant Examiner* — Zengpu Wei
(74) *Attorney, Agent, or Firm* — Jefferson IP Law, LLP (57) ABSTRACT

A user terminal device, which can execute an application created based on a dynamically typed language, such as JavaScript, a server, which provides reference information for compilation, and an application executing control method thereof are provided. The user terminal device includes a communicator configured to communicate with at least one server; a storage configured to store data of a source code of an application; and a processor configured to transmit identification information of the source code of the application to the at least one server, receive reference
(Continued)

information for compiling the source code corresponding to the transmitted identification information from the at least one server, and compile the source code of the application into a machine code based on the received reference information.

14 Claims, 7 Drawing Sheets

(58) Field of Classification Search
 USPC ........................................................ 717/148
 See application file for complete search history.

(56) References Cited

U.S. PATENT DOCUMENTS

| | | | |
|---|---|---|---|
| 8,539,464 | B2 | 9/2013 | Partridge et al. |
| 9,250,765 | B2* | 2/2016 | Nicolaou ............ G06F 3/04817 |
| 9,417,857 | B2* | 8/2016 | Chafi ....................... G06F 8/443 |
| 9,443,192 | B1* | 9/2016 | Cosic ......................... G06N 3/02 |
| 2003/0177479 | A1* | 9/2003 | Koseki ..................... G06F 8/441 |
| | | | 717/140 |
| 2006/0174235 | A1 | 8/2006 | Kamada et al. |
| 2010/0115501 | A1 | 5/2010 | Partridge et al. |
| 2010/0313189 | A1* | 12/2010 | Beretta ............... G06F 9/45516 |
| | | | 717/148 |
| 2013/0067441 | A1* | 3/2013 | Lafreniere ............ G06F 9/4552 |
| | | | 717/139 |
| 2013/0185626 | A1* | 7/2013 | Jang ..................... G06F 9/45516 |
| | | | 715/234 |
| 2013/0227388 | A1 | 8/2013 | Trunley et al. |
| 2015/0128115 | A1* | 5/2015 | Chafi ....................... G06F 8/443 |
| | | | 717/148 |
| 2015/0193117 | A1* | 7/2015 | Nicolaou ............ G06F 3/04817 |
| | | | 715/208 |
| 2016/0062878 | A1* | 3/2016 | Westrelin .............. G06F 9/4552 |
| | | | 717/130 |

FOREIGN PATENT DOCUMENTS

| | | |
|---|---|---|
| JP | 2013-105464 A | 5/2013 |
| KR | 10-2000-0018458 A | 4/2000 |
| KR | 10-2010-0033766 A | 3/2010 |
| KR | 10-2013-0003836 A | 1/2013 |
| KR | 10-1242479 B1 | 3/2013 |
| KR | 10-1520097 B1 | 5/2015 |

OTHER PUBLICATIONS

Chen et al, "Energy-Aware Compilation and Execution in Java-Enabled Mobile Devices", [Online], 2003, pp. 1-8, [Retrieved from internet on Feb. 9, 2021], <https://ieeexplore.ieee.org/stamp/stamp.jsp?tp=&arnumber=1213116> (Year: 2003).*

Corral et al, "Evolution of Mobile Software Development from Platform-Specific to Web-Based Multiplatform Paradigm", [Online], 2011, pp. 181-183, [Retrieved from internet on Feb. 9, 2021], <https://dl.acm.org/doi/pdf/10.1145/2048237.2157457> (Year: 2011).*

* cited by examiner

| App. #1 | |
|---|---|
| jQuery1.js | jQuery1.profile |
| jQuery2.js | jQuery2.profile |
| ⋮ | ⋮ |
| App. #2 | |
| jQuery1.js | jQuery1.profile |
| jQuery2.js | jQuery2.profile |
| ⋮ | ⋮ |

USER TERMINAL DEVICE, SERVER, AND APPLICATION EXECUTION METHOD THEREOF

TECHNICAL FIELD

Apparatuses and methods consistent with exemplary embodiments relate to a user terminal device which can execute an application (hereinafter, referred to a 'dynamic application') created based on a dynamically typed language, such as JavaScript, a server which provides reference information for compilation, and an application executing control method thereof.

BACKGROUND ART

Generally, in a programming language used to develop an application, there are a statically typed language, such as C, C++, Java or the like, in which types of variables are determined at a compilation time and a dynamically typed language, such as JavaScript, in which the types of variables are variable at an execution time.

The dynamically typed language is high in programming degree of freedom, but slow in execution speed, as compared to the statically typed language.

To be more specific, in the dynamically typed language, since the types of variables are variable at the execution time, it is difficult to directly compile a source code of a dynamic application into a native code or a machine code (hereinafter, referred to a 'machine code') actually executable in a user terminal device in which the dynamic application is executed. For example, if there is an expression "a+b" in JavaScript, when variables a and b are numerals, an addition operation should be carried out and when the variables a and b are character strings, a concatenation operation which concatenates the two character strings should be carried out. Accordingly, the user terminal device should identify types of operands, such as variables or the like, and check up to carry out operations corresponding to thereto every time before processing the expressions. As a result, the dynamic application becomes slow in execution speed.

To avoid that such a checkup takes place every time the expressions are executed, in a related art, a user terminal device compiles the source code of the dynamic application into the machine code using profile information collected in advance and thereby generates a binary execution file. In other words, the user terminal device corrects and stores profile information for compilation, such as, types of operands mainly used in expressions of the source code or the like, for a run time. If the profile information for compilation is sufficiently accumulated, the user terminal device compiles a source code into a machine code just in time (JIT) using the stored profile information to generate a binary execution.

The JIT compile manner which generates the machine code using the collected profile information as described above is fast in execution speed as compared to the manner which identifies the types of operands and check up to carry out operations corresponding to thereto every time before processing the expressions. However, since the JIT compile manner compiles the source code using only the profile information collected by the user terminal device during the execution of the dynamic application, there is a problem in that the collected profile information is restricted, thereby making the user terminal device difficult to obtain a high efficient and optimized binary execution file.

In a related art, another user terminal device requests JIT compilation to an external server when executing a dynamic application, and executes a compiled binary execution file received from the external server. However, since the machine code is generally different according to central processing units (CPUs) used in the user terminal device, there is a problem in that use of received binary execution file is restricted according to machine codes compiled in the external server. Also, since the binary execution file is received from external server and executed, there is a problem in that the user terminal device is vulnerable to viral infection, hacking or the like.

Technical Problem

Accordingly, apparatuses and methods consistent with exemplary embodiments provides a user terminal device, which receives reference information needed to compile a source code of an application created based on a dynamically typed language to perform a compile operation, thereby obtaining a more secure, optimized, and high quality binary execution file, a server, and an application executing method thereof.

Technical Solution

In accordance with an aspect of an exemplary embodiment, there is provided a user terminal device including: a communicator configured to communicate with at least one server; a storage configured to store data of a source code of an application; and a processor configured to transmit identification information of the source code of the application to the at least one server, receive reference information for compiling the source code corresponding to the transmitted identification information from the at least one server, and compile the source code of the application into a machine code based on the received reference information.

The identification information may include at least one of a unique identification (ID) able to identify the source code of the application or application information. Here, the application information may include at least one of a name and a version of the application or an ID assigned to the server with respect to the application.

The processor may be configured to further transmit at least one of the data of the source code of the application or use pattern information of the application in the user terminal device. Here, the use pattern information may include an application execution history which includes variables, such as characters, numerals or the like, inputted or selected by a user when the application is executed and functions used when the application is executed. In this case, the reference information may be produced based on at least one of first reference information generated from analyzing the source code of the application, or second reference information generated based on the use pattern information received from at least one of the user terminal device or other user terminal devices which communicate with the at least one server.

Further, the processor may be configured to receive from the server, the reference information at a preset time, for example, right after the application is installed, at a time designated by a user, on user's update request, or at preset time intervals.

Also, the reference information may include at least one of variable type information or execution flow information, which is used in the source code. Here, the variable type information may include variables used in the source code, types of expressions used in the source code and occurrence probabilities for the types of used expressions. Also, the execution flow information may include occurrence frequencies of execution flows in the source code and occurrence frequencies of methods used in the source code.

The processor may include a just-in-time (JIT) compiler configured to compile the source code of the application just in time in real time based on the received reference information during an execution time of the application.

Also, the processor may include an ahead-of-time (AOT) compiler configured to compile the source code of the application in advance based on the received reference information before executing the application. In this case, the processor may be configured to control the AOT compiler to perform a compile operation at a time where the application is downed and installed, or at an idle time where the user terminal device is not used after installing the application.

Alternatively, the processor may be configured to receive reference information from a plurality of servers, combine the received reference information to form unified reference information, and compile the source code of the application into the machine code using the unified reference information as the reference information for compiling the source code.

In accordance with an aspect of another exemplary embodiment, there is provided an application executing method of a user terminal device including: transmitting identification information of a source code of an application to at least one server; receiving reference information for compiling the source code corresponding to the transmitted identification information from the at least one server; and compiling the source code of the application into a machine code based on the received reference information.

The transmitting may include further transmitting at least one of data of the source code of the application or use pattern information of the application in the user terminal device. In this case, the reference information may be produced based on at least one of first reference information generated from analyzing the source code of the application, or second reference information generated based on the use pattern information received from at least one of the user terminal device or other user terminal devices which communicate with the at least one server.

The receiving may include receiving from the server, the reference information at a preset time, for example, right after the application is installed, at a time designated by a user, on user's update request, or at preset time intervals.

The compiling may include compiling the source code of the application just in time based on the received reference information during an execution time of the application.

Also, the compiling may include compiling the source code of the application in advance based on the received reference information before executing the application.

Alternatively, the compiling may include receiving reference information from a plurality of servers, combining the received reference information to form unified reference information, and compiling the source code of the application into the machine code using the unified reference information as the reference information for compiling the source code.

In accordance with further an aspect of further another exemplary embodiment, there is provided a server including: a communicator configured to communicate with a plurality of user terminal devices; and a processor configured to receive identification information of a source code of an application from a first user terminal device from among the plurality of user terminal devices, and transmit reference information for compiling the source code corresponding to the received identification information to the first user terminal device.

The processor may be configured to further receive at least one of data of the source code of the application or use pattern information of the application in the first user terminal device. Here, the processor may be configured to generate first reference information analyzing the source code of the application, generate second reference information based on use pattern information received from at least one of the first user terminal device or second user terminal devices which communicate with the server, produce reference information based on at least one of the first reference information or the second reference information, and transmit the produced reference information to the first user terminal device.

Also, the processor may be configured to, in response to the use pattern information of the application and the reference information being set to be updated at preset time intervals or the reference information being requested by the first user terminal device at a preset request time, update the reference information based on use pattern information received from at least one of the first user terminal device or second user terminal devices which communicate with the server.

In accordance with an aspect of other exemplary embodiment, there is provided an information providing method of a server including: receiving identification information of a source code of an application from a first user terminal device from among the plurality of user terminal devices; and transmitting reference information for compiling the source code corresponding to the received identification information to the first user terminal device.

The receiving may include further receiving at least one of data of the source code of the application or use pattern information of the application in the first user terminal device. in this case, the transmitting may include generating first reference information analyzing the source code of the application, generating second reference information based on use pattern information received from at least one of the first user terminal device or second user terminal devices which communicate with the server, producing reference information based on at least one of the first reference information or the second reference information, and transmitting the produced reference information to the first user terminal device.

The information providing method of the server may further include updating, in response to the use pattern information of the application and the reference information being set to be updated at preset time intervals or the reference information being requested by the first user terminal device at a preset request time, the reference information based on use pattern information received from at least one of the first user terminal device or second user terminal devices which communicate with the server.

BEST MODE

Below, exemplary embodiments will be described in detail with reference to accompanying drawings. It should be understood that like reference numerals or symbols presented in respective drawings denote like elements.

Figure 1:
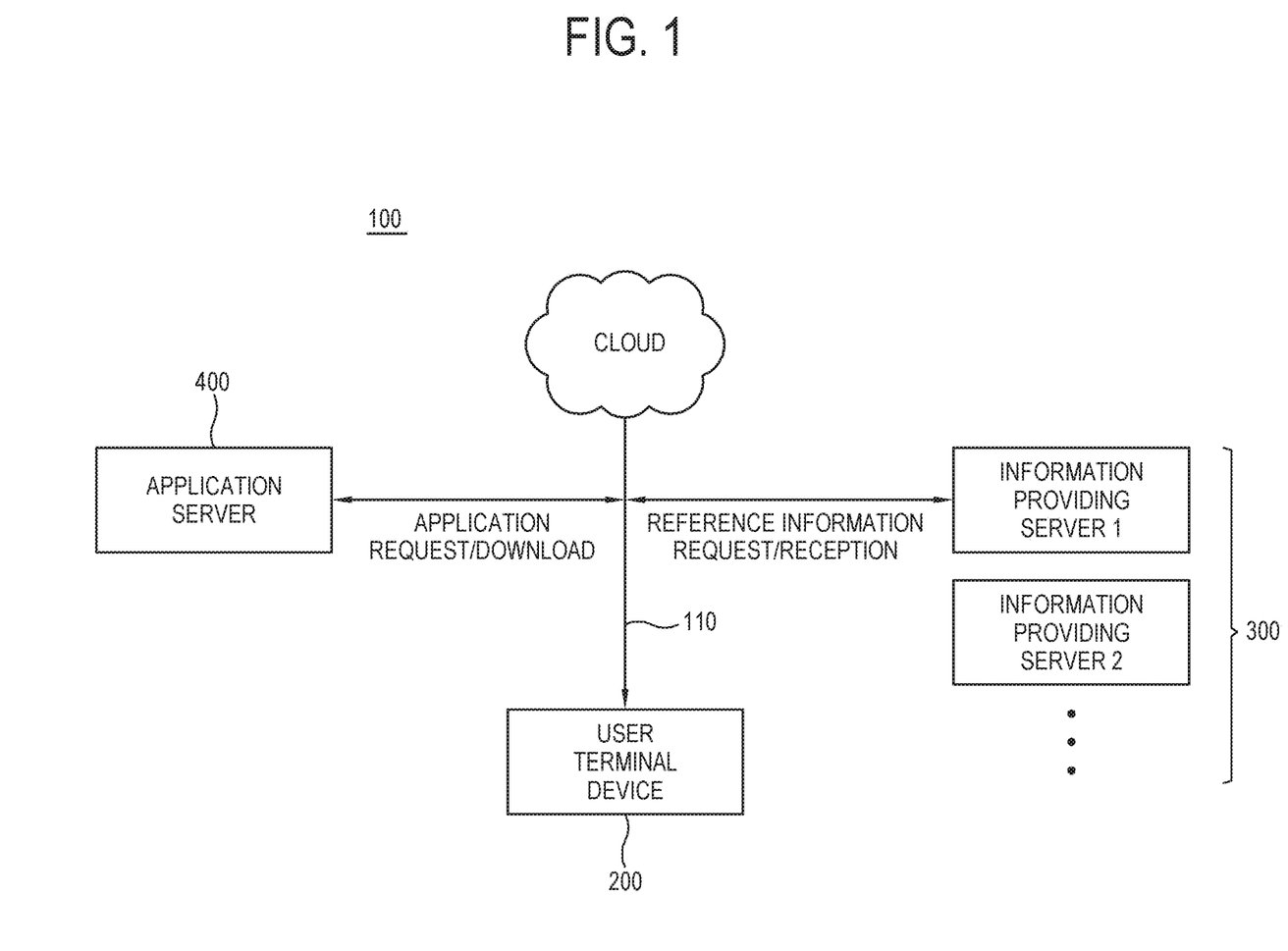
FIG. 1 is a block diagram illustrating a configuration of an application executing system including a user terminal device and an information providing server according to an exemplary embodiment.

FIG. 1 is a block diagram illustrating a configuration of an application executing system 100 including a user terminal device 200 and an information providing server 300 according to an exemplary embodiment.

The user terminal device 200 and the information providing server 300 according to an exemplary embodiment are connected with each other via a network 110.

The network 110 includes a device or infrastructure which is used in performing communication to send and receive user's inputs and information about information providing services, and may be wired and/or wireless network, such as internet or the like.

Figure 2:
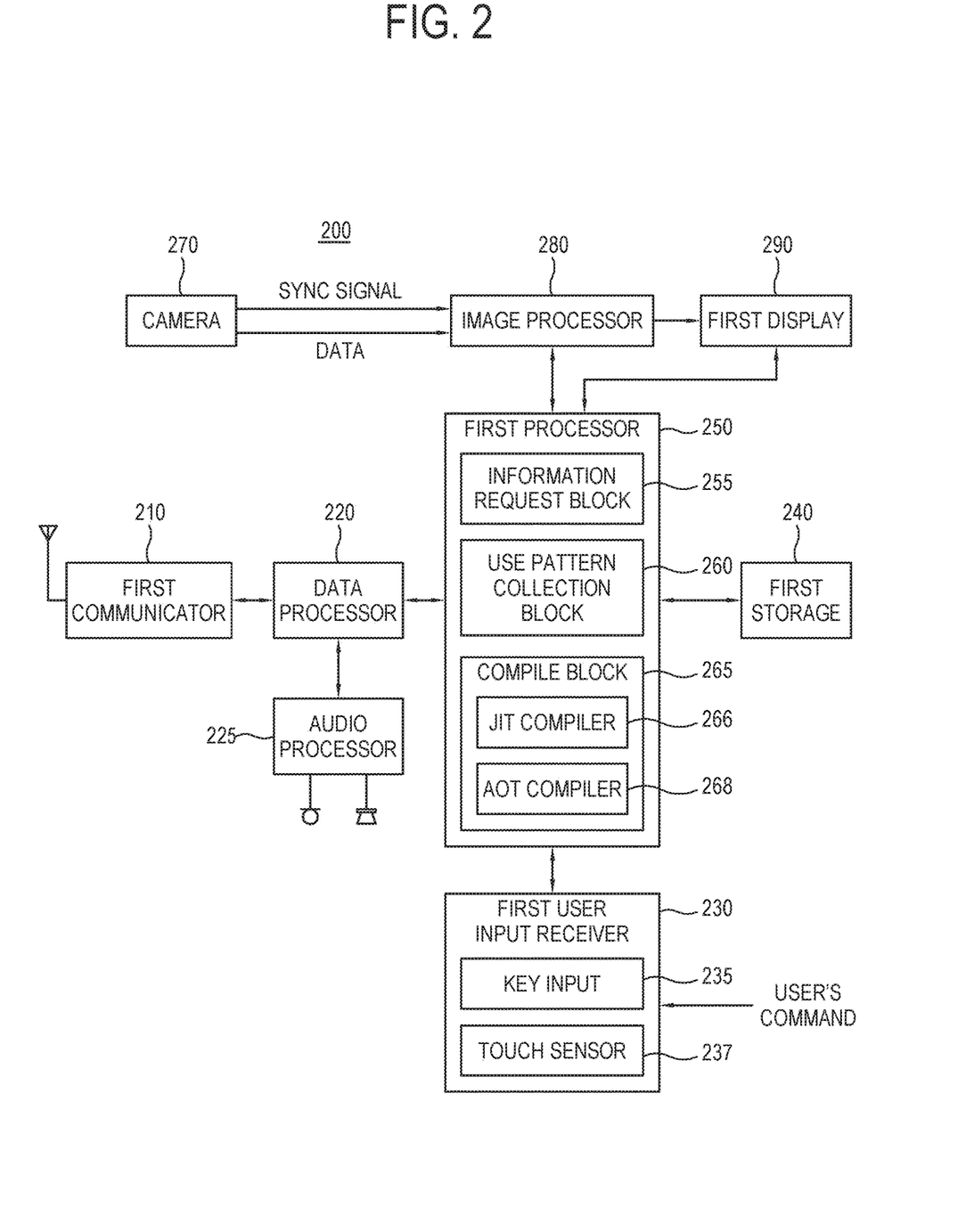
FIG. 2 is a block diagram illustrating a configuration of the user terminal device illustrated in FIG. 1.

FIG. 2 is a block diagram illustrating a configuration of the user terminal device 200 according to an exemplary embodiment.

The user terminal device 200 according to an exemplary embodiment may include a portable terminal device or a fixed terminal device. The portable terminal device, which is a portable electronic apparatus easy to transport, may be a video telephone, a mobile phone, a smart phone, a wideband code division multiple access (WCDMA) user terminal, a universal mobile telecommunication service (UMTS) user terminal, a personal digital assistant (PDA), a portable multimedia player (PMP), a digital multimedia broadcasting (DMB) user terminal, an E-Book, a portable computer (notebook, tablet or the like), a digital camera, etc. The fixed terminal device may be a desktop personal computer (PC), a smart television (TV), etc.

Hereinafter, the user terminal device 200 according to an exemplary embodiment will be described as, for example, a smart phone.

Referring to FIG. 2, the user terminal device 200 according to an exemplary embodiment includes a first communicator 210, a data processor 220, an audio processor 225, a first user input receiver 230, a first storage 240, a first processor 250, a camera 270, an image processor 280 and a first display 290.

The first communicator 210, which is a communication part able to send and receive data to and from external servers, for example, the information providing server 200 and an application server 400, via the network 110, performs wireless communication function for the user terminal device 200.

To this end, the first communicator 210 may include a radio frequency (RF) transmitter and a RF receiver. The RF transmitter amplifies a signal which is transmitted to an external via an access point (AP) of the network 110, and up-converts a frequency of the signal. The RF receiver low noise-amplifies a signal which is received from the external via the AP, and down-converts a frequency of the signal.

The data processor 220 includes a transmitter to encode and modulate the signal which is transmitted to the external, and a receiver to decode and demodulate the signal which is received from the external. For example, the data processor 220 may include a modem and a codec. Here, the codec has a data codec which processes packet data or the like and an audio codec which processes an audio signal, such as a voice or the like.

The audio processor 225 performs a function which reproduces a reception audio signal outputted from the audio codec of the data processor 220 or transmits a transmission audio signal generated from a microphone to the audio codec of the data processor 220.

The first user input receiver 230 receives a user's command. The user's command includes information allowing the user terminal device 200 to determine whether to perform a given operation in response to a user's action or behavior. Here, the given operation may include an operation for controlling basic functions of the user terminal device 200, such as power on/off, volume control or the like, and an operation for inputting various execution commands and settings required for executing all sorts of programs stored in the first storage 240. Such a user's command may include a key input signal inputted through a key input 235 and/or a touch input signal inputted through a touch sensor 237.

The key input 235 includes input keys or buttons formed on a front lower part or a side of a casing (not illustrated) of the user terminal device 200. The key input 235 generates a key signal related to function control of the user terminal device 200 in response to a user's input through the input keys or buttons, and transmits the generated key signal to the first processor 250. The key signal includes a power on/off signal, a volume control signal, etc. The first processor 250 controls a corresponding function and/or element in response to the key signal received by the key input 235.

The touch sensor 237 is mounted on a front of the first display 290, and generates a touch input signal in response to a user's manipulation through a touch input tool, such as a pen, a user's finger and the like to transmit the first processor 250. The first processor 250 controls a corresponding function and/or element in response to the touch input signal. Such a touch sensor 237 may be implemented as a resistive type sensor, a capacitive type sensor, a pressure type sensor, etc.

The first storage 240 may include a program memory and a data memory. The program memory may store a control program, such as a firmware, an operation system (OS) or the like, for controlling general operations of the user terminal device 200 and data for source codes of all sorts of applications downloaded from the application server 400. The data memory performs a function which temporarily stores data generated while executing applications and/or programs. Also, the data memory stores authentication information, login information, identification information of source codes of dynamic applications, reference information for compilation received from the information providing server 300, use pattern information collected by a use pattern collection block 260 of the first processor 250, binary execution files compiled by a compile block 265, etc., which will be described later.

The first storage 240 may be implemented as a storing medium which includes any one of a flash memory, a hard disk, a multimedia card micro memory, a card memory (for example, a secure digital (SD) memory card, a XD memory card or the like), a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc.

The first processor 250 controls all operations of the user terminal device 200, and in particular, controls a function of the user terminal device 200 according to an input signal received from the first input receiver 230.

The first processor 250 may include a CPU and a RAM, which execute programs and applications stored in the storage 240.

Also, the first processor 250 performs a function which compiles a source code of a dynamic application created based on a dynamically typed language, such as JavaScript, into a machine code executable by the user terminal device 200 before executing the dynamic application, according to an exemplary embodiment.

To this end, the first processor 250 includes an information request block 255, a use pattern collection block 260 and a compile block 265.

The information request block 255 performs an operation which when joining a server account of the information providing server 300, transmits authentication information to the information providing server 300 according to a user's command inputted through the first user input receiver 230 to join the server account. Here, the authentication information may include a unique ID, the unique ID and an inner encryption key, or the unique ID and a production or manufacture's serial number of the user terminal device 100.

Further, the information request block 255 performs an operation which when logging in to the information providing server 300, transmits login information to the information providing server 300 to log in thereto. The login information may include a server account ID and a password.

Furthermore, the information request block 255 makes a request for reference information for compiling dynamic applications installed in the user terminal device 200 to the information providing server 300, receives the reference information from the information providing server 300, and stores the received reference information in the first storage 240. At this time, the information providing server 300 which requests to transmit the reference information may be preset as one server which provides good quality reference information from among a plurality of information providing servers 300 via a compile setting menu (not shown) of an environment setting screen of the control program of the user terminal device 200 (or a compile setting menu of a compile execution program if the information request block 255, the use pattern collection block 260 and the compile block 265 are implemented as the compile execution program, as described later) according to a user's command inputted through the first user input receiver 230.

Also, when requesting the reference information to the information providing server 300, the information request block 255 transmits a request for reference information and identification information of the source code of the dynamic application to the information providing server 300 through the first communicator 210. Here, the identification information may include a unique ID able to identify the source code of the dynamic application and/or application information. The application information may include at least one of an ID assigned to the information providing server 300 with respect to the dynamic application, or a name and a version of the dynamic application.

A time where the information request block 255 requests the reference information is preset via the compile setting menu according to a user's command inputted through the first user input receiver 230. For example, the time for reference information request may be set as any of right after the dynamic application is installed, a time designated by the user, upon user's update request, and preset time intervals, for example, every 6 hours.

Also, the information request block 255 may further transmit to the information providing server 300, the source code of the dynamic application and/or use pattern information as basic information for generating the reference information.

Such a further transmission of the source code and/or the use pattern information may be performed when the information providing server 300 requests the further transmission as it does not have the source code stored therein or for updating the source code and/or the use pattern information, as described later with respect to the information providing server 300.

Also, alternatively, if there is any related setting through the compile setting menu, the source code and/or the use pattern information may be transmitted together with identification information of the source code of the dynamic application to the information providing server 300 when the information request block 255 requests the reference information to the information providing server 300.

When the dynamic application is executed via the compile block 265 in the user terminal device 200, the use pattern collection block 260 collects use pattern information of the dynamic application and stores the collected use pattern information in the first storage 240. Here, the use pattern information may include variables, such as characters, numerals and the like inputted or selected by the user, and application execution histories, such as used functions or the like.

Alternatively, the use pattern collection block 260 may not only collect the use pattern information, but also generate estimated reference information based on the use pattern information to store in the first storage 240. Here, the estimated reference information may include variables of the source code, types of expressions of the source code, occurrence probabilities for the expressions, or run streams of flows of the source code, which are estimated based on the use pattern information in the same manner as that of reference information to be described later with respect to the information providing server 300. In this case, when receiving the reference information from the information providing server 300, the use pattern collection block 260 may combine the estimated reference information with the received reference information to form unified reference information, and store the unified reference information as reference information in the first storage 240 to allow the compile block 265 to use the unified reference information in compilation. Or, when the information request block 255 transmits the use pattern information of the dynamic application to the information providing server 300, the information request block 255 may transmit the estimated reference information instead of the use pattern information, so that the information providing server 300 generates reference information using the estimated reference information instead of the use pattern information.

Upon receiving the request from the information request block 255, the compile block 265 complies the source code of the dynamic application into the machine code based on the reference information received from the information providing server 300 thereby to generate an optimized binary execution file.

To this end, the compile block 265 is configured to include a toolchain or single program which includes a compiler, a linker, and a binary converter.

The compiler may be implemented as at least one of a just-in-time (JIT) compiler 266 or an ahead-of-time (AOT) compiler 288.

The compile block 265 according to an exemplary embodiment includes both the JIT compiler 266 and the AOT compiler 268 as the compiler.

The JIT compiler 266 performs a compile operation in real time, i.e., just in time, for an execution time of the dynamic application. Accordingly, the JIT compiler 266 provides a quick performance in an application in which specific expressions, methods (or functions) or run streams are repeated since if the specific expressions, methods or run streams are compiled and executed once, machine codes thereof can be stored and then executed immediately, but a deteriorated performance in an application that is not the case since all of expressions, methods or run streams should be consistently compiled. Also, the JIT compiler 266 increases burdens on the CPU and memory of the first processor 250 since it performs the compile operation just in time.

The AOT compiler 268 performs a compile operation in advance before executing the dynamic application. Accordingly, the AOT compiler 268 may reduce a start time of the application and share machine codes compiled in many processes. However, since the compiled machine codes are larger than the source code before being complied, there is a need to increase a storage capacity for the first storage 240.

Accordingly, it is preferably configured, so that according to dynamic applications to be compiled, any one of the JIT compiler 266 and the AOT compiler 268 is properly selected.

To this end, the compiler for compiling the dynamic application may be selected as either the JIT compiler 266 or the AOT compiler 268 via the compile setting menu according to a user's command inputted through the first user input receiver 230 before executing the dynamic application.

If the JIT compiler 266 is selected as the compiler for compiling the dynamic application, for an execution time of the dynamic application, the compile block 265 performs a compile operation just in time based on the reference information received from the information providing server 200 via the JIT compiler 266 to generate a binary execution file.

If the AOT compiler 268 is selected as the compiler, the compile block 265 performs a compile operation in advance at a preset time based on the reference information received from the information providing server 200 via the AOT compiler 268 to generate a binary execution file, and stores the generated binary execution file in the first storage 240. Here, a time where the compile block 265 performs the compile operation in advance is preset via the compile setting menu according to a user's command inputted through the user input receiver 230. For example, the compile operation may be set to be performed in advance at a time where the dynamic application is downloaded and installed, or at an idle time where the user terminal device 200 is not operated after installing the application. If the dynamic application is executed by a user's command, the first processor 250 reads out the stored binary execution file from the first storage 240 via the compile block 265 to execute the dynamic application.

Figure 3:
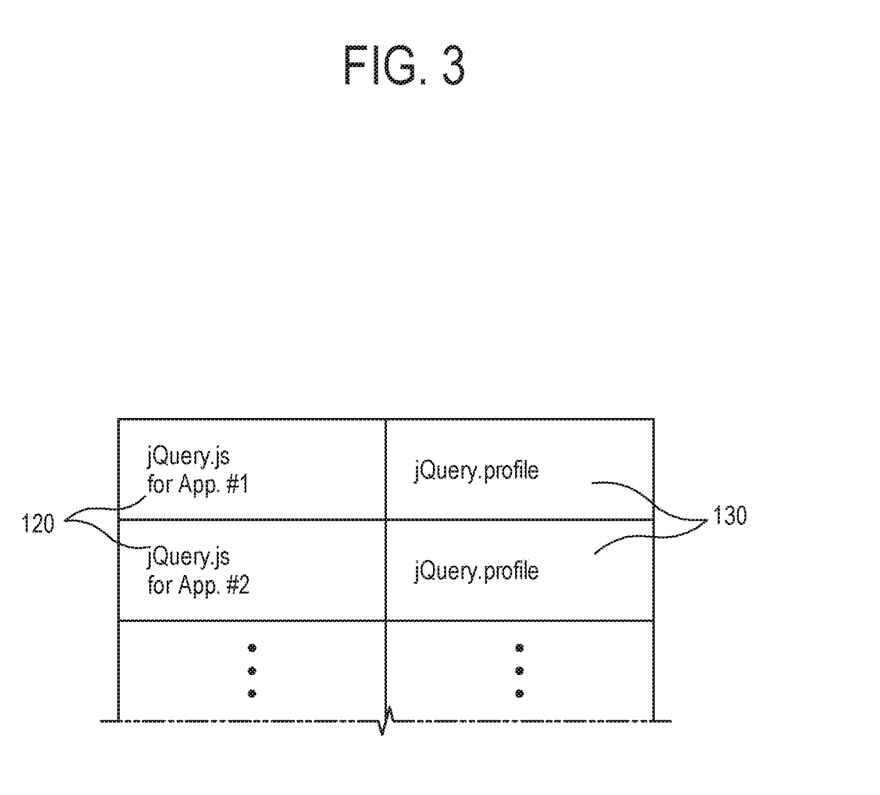
FIG. 3 is a view illustrating an example of generating an application profile as a reference information for compilation.

The reference information for compiling the dynamic application may be composed of an application profile 130 which includes profile information for all of a plurality of source files constituting the source code (120 in FIG. 3) of the dynamic application. As illustrated in FIG. 3, the application profile 130 is generated with respect to all the source files of the source code 120 of the dynamic application based on at least one of the source code 120 of the dynamic application or use pattern information of the user(s) for the user terminal device 200 and/or other user terminal device, as described later with respect to the information providing server 300, and transmitted to the user terminal device 200. The application profile 130 received in the user terminal device 200 is stored according to applications in the first storage 240.

The profile information of the application profile 130 may include at least one of variable type information or execution flow information used in the whole of the source files of the corresponding source code.

The variable type information may include used variables, types of used expressions, and occurrence probabilities for the types of used expressions.

The variables includes an integer (1), a decimal (2), a character string (3), etc., which are used as variables X as below.

var x;

$$x=10; \quad (1)$$

$$x=12.5; \quad (2)$$

$$x=\text{"hello"}; \quad (3)$$

The types of expressions includes an operation type performed by an expression, for example, "a+b", which are used as below. For example, the operation type includes an addition operation (4) performed if the variables x (a, b) are numerals, and a concatenation operation (5) performed if character strings.

a+b $$10+12.5 \rightarrow 22.5 \quad (4)$$

$$\text{"hello"}+\text{"world"} \rightarrow \text{"helloworld"} \quad (5)$$

The occurrence probabilities for the types of used expressions mean probabilities A (%) that specific operation types performed by the used expressions, for example, "a+b", occur, respectively.

The occurrence probabilities A (%) may be calculated by the following expression (6).

$$A\ (\%) = (\text{the number of occurrences for specific operation type/the total number of occurrences for all of performed operation types}) \times 100 \quad (6)$$

The execution flow information includes occurrence frequencies of execution flows related to which flow is more performed, occurrence frequencies of methods related to which method (or function) is more invoked, or the like.

For example, it may be identified that in the following execution process, if x=11 and x=3.14 occur 99 times and one time, respectively, 'print ("hello")' was more performed than 'print ("Bye")' and x=11 was more invoked.

If (x>10)
print ("hello")
else
print ("Bye")

Figure 4:
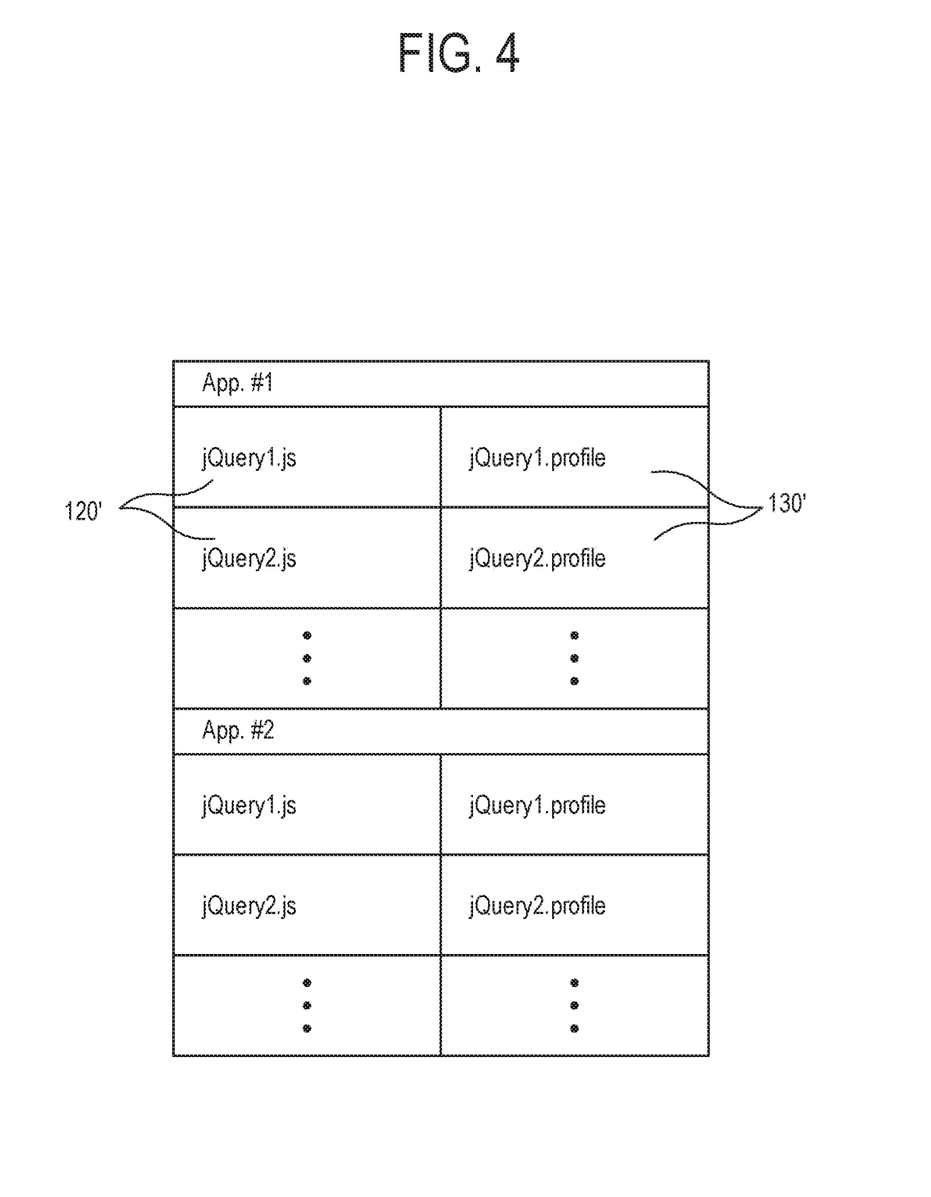
FIG. 4 is a view illustrating another example of generating a plurality of application profiles as the reference information for compilation.

Alternatively, as illustrated in FIG. 4, the reference information for compiling the dynamic application may be composed of a plurality of profiles 130', each of which includes profile information generated with respect to each of a plurality of source files 120' constituting the source code of the dynamic application. The profiles 130' are generated to correspond to the source files 120' constituting the source code of the dynamic application, respectively, based on at least one of the source code of the dynamic application or user pattern information for the user of the user terminal device 200 and/or other user terminal devices, in the information providing server 300, and transmitted to the user terminal device 200. The profiles 130' received in the user terminal device 200 are stored to correspond to the source files 120', respectively, according to applications in the first storage 240.

When the compile block 265 compiles the source code into the machine code, the reference information for compilation provides information about which type the variables, the expressions and the like in the dynamically typed language-based source code are operated, how much are occurrence probabilities according to types, which flow was performed frequently or much and so on thereby to directly compile the source code into the machine code without checking up the variables, the expressions and the like and identifying the flows and the methods, thereby enabling the compile block 265 to quickly generate the binary execution file.

Further, the reference information for compilation is generated based on the use pattern information of other user terminal devices, as well as the user terminal device 200, thereby enabling the compile block 265 to generate a highly efficient and optimized binary execution file.

Also, the compile block 265 receives the reference information for compilation from the external information providing server 300 and performs an compile operation based on the received reference information for compilation, thereby resolving problems encountered according to receiving the compiled binary execution file from the external server, i.e., a problem that use of the compiled binary execution file is restricted according to central processing units (CPUs) used in the user terminal device and a danger, such as viral infection, hacking or the like, which is caused by downloading the compiled binary execution file from the external, as in the related art user terminal device.

The information request block 255, the user pattern collection block 260 and the compile block 265 as described above may be implemented as an application specific integrated circuit (ASIC) which is designed to embed therein, a compile execution program having corresponding functions.

Alternatively, the information request block 255, the user pattern collection block 260 and the compile block 265 may be implemented as a compile execution program having corresponding functions instead of the ASIC. In this case, the compile execution program is stored in the first storage 240 to be executable by control of the first controller 250.

As above, although the first processor 250 of the user terminal device 200 has been described as requesting the reference information of the dynamic application to only one information providing server 300 selected by the user and receiving the reference information therefrom, the present disclosure is not limited thereto. For example, the first processor 250 may request the reference information to a plurality of information providing servers 300 which is selected in advance by the user via the compile setting menu. In this case, the first processor 250 combines reference information received from the plurality of information providing servers 300 according to applications to form unified reference information, and stores the unified reference information as reference information of the dynamic applications in the first storage 240.

Referring again to FIG. 2, the camera 270 is provided with a camera sensor which captures image data and which converts a captured optical signal into an electrical signal, and a signal processor which converts a captured analog image signal from the camera sensor into digital data. Here, the camera sensor may be implemented as a CCD or CMOS sensor, and the signal processor may be implemented as a digital signal processor (DSP). Also, the camera sensor and the single processor may be implemented in a body or as being separated from each other.

The image processor 280 performs an image signal processing (ISP) for displaying an image signal outputted from the camera 270 on the first display 290. The ISP may include performing functions, such as gamma correction, interpolation, spatial change, image effect, image scaling, auto white balance (AWB), after effect (AE), automatic focus (AF), etc. Accordingly, the image processor 280 processes the image signal outputted from the camera 270 by frame basis and outputs the processed frame image data to meet characteristic and size of the first display 290. Further, the image processor 280 has an image codec, and performs a function which compresses the frame image data displayed on the first display 290 in a preset manner or restores the compressed frame image data into the original frame image data. Here, the image codec may be a JPEG codec, a MPEG4 codec, a wavelet codec, etc.

Also, the image processor 280 may have an on screen display (OSD) function and display OSD data according to a screen size which is displayed under control of the first processor 250.

The first display 290 displays an image corresponding to an image signal outputted from the image processor 280 on a screen, and displays user data outputted from the first processor 250. Here, the first display 290 may be implemented as a liquid crystal display (LCD). In this case, the first display 290 may include a LCD controller, a memory able to store image data, LCD elements. Etc.

Also, the first display 290 includes a touch sensor 237 on a front thereof.

Hereinafter, an application executing process of the user terminal device 200 according to an exemplary embodiment configured as described above will be explained with reference to FIG. 5.

Figure 5:
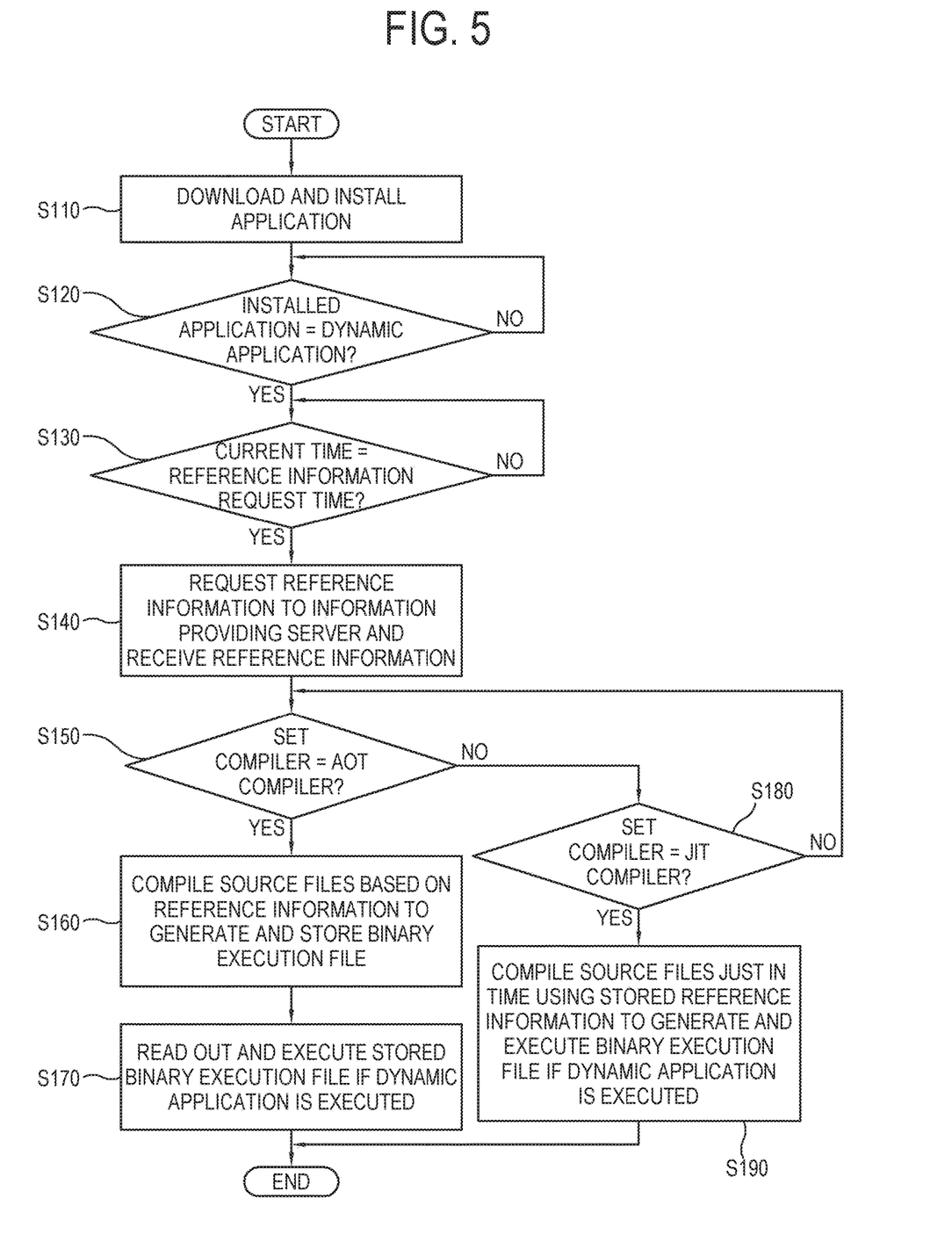
FIG. 5 is a flowchart illustrating an application executing process of the user terminal device illustrated in FIG. 1.

First, if a specific application is downloaded from the application server 400 via the network 110 and installed in the user terminal device 200 (S100), the first processor 250 of the user terminal device 200 identifies whether the installed application is a dynamic application created based on a dynamically typed language, such as JavaScript (S120).

As a result of identification at the operation S120, if the installed application is the dynamic application, the first processor 250 identifies whether a current time is a preset time for reference information request (S130). Here, the preset time for reference information request may be set as at least one of, for example, right after the dynamic application is installed, a time designated by the user, upon user's update request, or preset time intervals, for example, every 6 hours, via the compile setting menu according to a user's command inputted through the user input received 230.

As a result of identification at the operation S130, if the current time is the preset time for reference information request, the first processor 250 logs in to a preset information providing server 300 according to a given process through the first communicator 210, and then transmits a request for reference information together with identification information of a source code of the dynamic application. At this time, if there is any setting which is preset via the compile setting menu to further provide the source code and/or user pattern information, or there is any request from the information providing server 300 to which the request for reference information is transmitted, the first processor 250 may further transmit the source code and/or the user pattern information as basic information form generating the reference information to the information providing server 300. And then, if the reference information is received from the information providing server 300, the first processor 250 stores the received reference information in the first storage 240 (S140). Alternatively, if requesting the reference information to a plurality of information providing servers 300 and receiving the reference information therefrom, the first processor 250 may combine the reference information received from the plurality of information providing servers 300 to form unified reference information, and store the unified reference information in the first storage 240.

After that, the first processor 250 identifies whether the AOT compiler 268 is set as a compiler form executing the dynamic application (S150).

As a result of identification at the operation S150, if the set compiler is the AOT compiler 268, the first processor 250 generates compiles source files of the source code of the dynamic application in advance to generate a binary execution file, based on the reference information stored in the first storage 240, and stores the generated binary execution file in the first storage 240 (S160). At this time, the binary execution file may be generated at a preset time, for example, a time where the dynamic application is downed and installed, or an idle time where the user terminal device 200 is not used after installing the application.

And then, if the dynamic application is executed by a user's command inputted through the user input receiver 230, the first processor 250 reads out the binary execution file corresponding to the executed dynamic application from the first storage 240 to execute the binary execution file (S170).

Meanwhile, As a result of identification at the operation S150, if the set compiler is not the AOT compiler 268, the first processor 250 identifies whether the set compiler is the JIT compiler 266 (S180).

As a result of identification at the operation S180, if the set compiler is the JIT compiler 266, the first processor 250 identifies whether the dynamic application is executed, and if the dynamic application is executed, the first processor 250 compiles source files of the source code just in time using corresponding reference information of the dynamic application to generate a binary execution file, and executes the generated binary execution file (S195).

Figure 6:
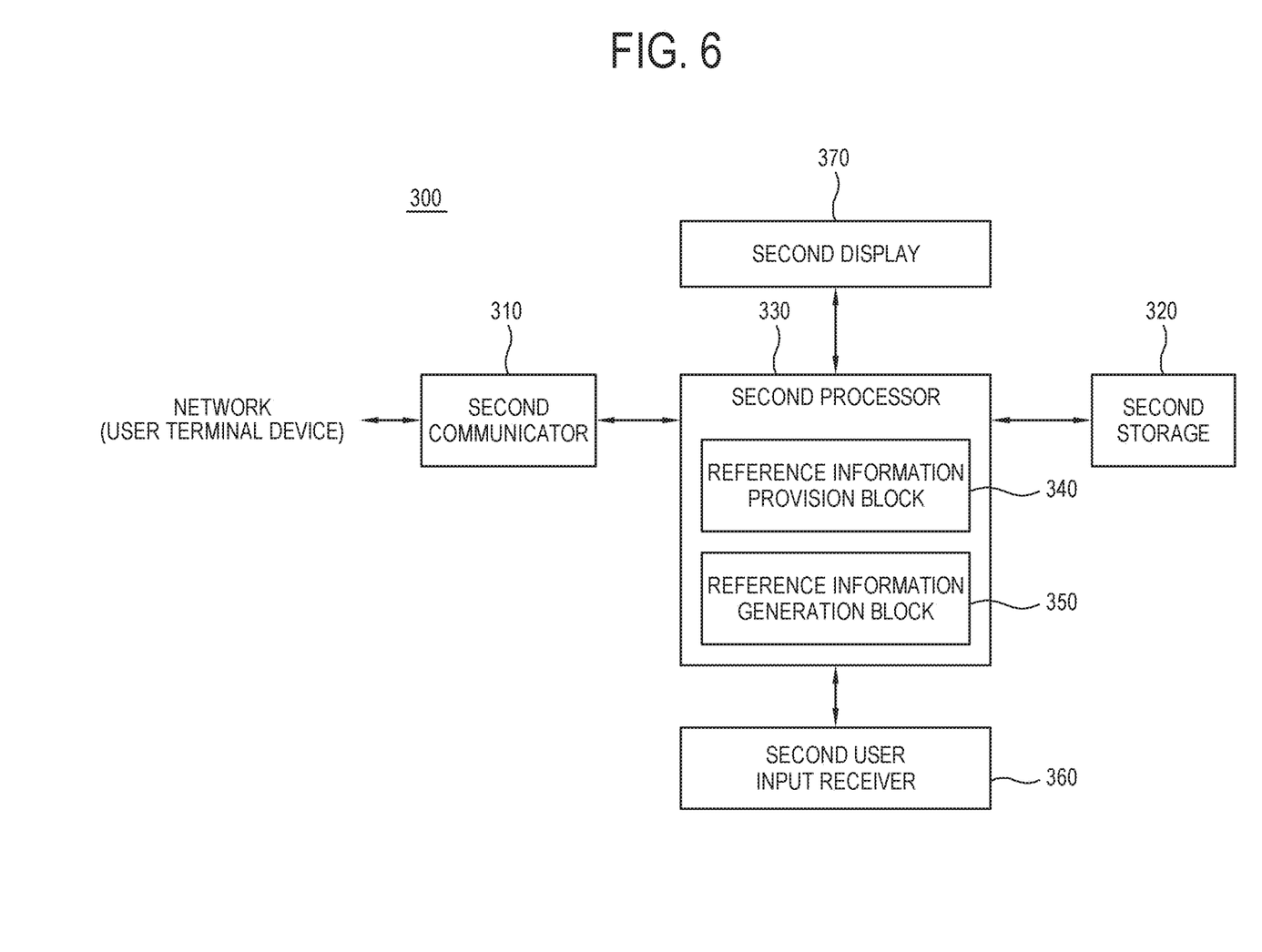
FIG. 6 is a block diagram illustrating a configuration of the information providing server illustrated in FIG. 1.

FIG. 6 is a block diagram illustrating a configuration of the information providing server 300 according to an exemplary embodiment.

The information providing server 300 may be implemented as at least one server which is managed and operated by a manufacturer of the user terminal device 200 and/or an information provider.

In the exemplary embodiment, the information providing server 300 is explained as, for example, including a plurality of servers.

If there is a request for reference information from the user terminal device 200 connected via the network 110 in a remote location, each of the information providing servers 300 provides reference information for compiling corresponding dynamic application.

To this end, as illustrated in FIG. 6, each of the information providing servers 300 includes a second communicator 310, a second storage 320, a second processor 330, a second user input receiver 360, and a second display 370.

The second communicator 310 performs communication with the first communicator 210 of the user terminal device 200 via the network 110. The second communicator 310 may be implemented as wired/wireless communication module configured to connect to the network 110.

Also, the second communicator 310 receives a request for reference information together with identification information of a source code of corresponding dynamic application from the first communicator 210 of the user terminal device 200, and transmits reference information generated by a reference generation block 350 of the second processor 330 to the first communicator 210 of the user terminal device 200, as will be described later.

Like the first storage 240 of the user terminal device 200, the second storage 320 may include a program memory and a data memory. The program memory may store a control program, such as a firmware, an OS or the like, for controlling operations of the information providing server 300 and all sorts of applications. The data memory stores all sorts of data, such as reference information or the like, generated according to operations of the information providing server 300. Further, the data memory may store source codes of dynamic applications received from the user terminal device 200 and other user terminal devices (not illustrated) which request the reference information, identification information for source codes, use pattern information, authentication information of user terminal devices, sever account information, etc. Also, the data memory may store reference information for compiling dynamic applications which are generated by the reference information generation block 350 based on the source codes of the dynamic applications and/or use pattern information. At this time, the reference information is stored according to applications if it includes an application profile 130, as illustrated in FIG. 3, and stored to correspond to the respective source files 120' according to applications if a plurality of profiles 130', as illustrated in FIG. 4.

Like the first storage 240, the second storage 320 may be implemented as a storing medium which includes any one of a flash memory, a hard disk, a multimedia card micro memory, a card memory (for example, a SD memory card, a XD memory card or the like), a RAM, a SRAM, a ROM, an EEPROM, a PROM, a magnetic memory, a magnetic disc, an optical disc.

The second processor 330 controls general operations of the information providing server 300, and may include a CPU and a RAM, which execute control program and applications stored in the second storage 320.

Also, the second processor 330 performs a function which generates and provides reference information for compiling the dynamic application when receiving a request for reference information from the user terminal device 200.

To this end, the second processor 330 includes a reference information provision block 340 and a reference information generation block 340.

The reference information provision block 340 requests authentication information to the user terminal device 200 via the second communicator 310 to authenticate the user terminal device 200 when the user terminal device 200 joins a server account, and compares received server account information including a sever account ID and a password with server account information stored in the second storage 320 to allow the user terminal device 200 to log in to the information providing server 300 when the user terminal device 200 requests the login after joining the server account.

Further, if receiving a request for reference information together identification information for a source code of the dynamic application, the reference information provision block 340 retrieves reference information corresponding to the received identification information from among reference information stored in the second storage 320, and transmits the retrieved reference information to the user terminal device 200.

Also, the reference information provision block 340 requests the source code and use pattern information of the dynamic application, which are used by the reference information generation block 350 to generate the reference information, to the user terminal device 200 and/or other user terminal devices, and receives the source code and the use pattern information of the dynamic application therefrom.

To be more specific, if reference information for compiling a certain dynamic application is first requested to the information providing server 300, the information providing server 300 does not have the corresponding reference information. In this case, it needs for the reference information generation block 350 to newly generate the reference information to provide to the user terminal device 200. To this end, the reference information provision block 340 requests a source code and use pattern information of the corresponding dynamic application to the user terminal device 200, and stores data of the source code and the use pattern information received from the user terminal device 200 in the second storage 320. In addition, the reference information provision block 340 requests use pattern information of the corresponding dynamic application to other user terminal devices connected to the information providing server 300, and stores the use pattern information received from the other terminal devices in the second storage 320.

Also, the use pattern information of the dynamic application and/or the reference information may be preset to be updated at preset time intervals, for example, every 12 hours. Here, the update time may be set via a reference information menu (not illustrated) of an environment setting screen of the control program of the information providing server 300 displayed on the second display 370 according to a user's command inputted through the second user input receiver 360. In this case, the reference information provision block 340 requests pattern information of the corresponding dynamic application to the user terminal device 200 and/or the other user terminals at preset time intervals, and updates and stores the use pattern information received from the user terminal device 200 and/or the other terminal devices according to devices in the second storage 320.

The reference information generation block 350 generates reference information for compilation based on the source code of the dynamic application stored in the second storage 320 and/or the user pattern information of the user terminal device 200 and/or the other terminal devices, and stores the generated reference information in the second storage 320.

To be more specific, the reference information generation block 350 analyzes the source code of the dynamic application stored in the second storage 320 to generate a first application profile including profile information for the whole of a plurality of source files of the source code, and stores the generated first application profile as first reference information in the second storage 320. Here, the analysis of source code may be performed using a static analysis tool or algorithm. The static analysis tool or algorithm is configured to mathematically analyze which type the variables, the expressions and the like in each source file 120 are operated, how much are occurrence probabilities according to types, which flow was performed frequently or much, which method or function is invoked frequently or much and so on, thereby to generate reference information as described above with reference to FIG. 3.

At this time, alternatively, if the reference information is generated as a plurality of profiles 130' as illustrated in FIG. 4, the reference information generation block 350 may analyze the source code of the dynamic application to generate a plurality of first profiles, each of which includes profile information for each of a plurality of source files 120 of the source code, and store the plurality of generated first profiles as first reference information in the second storage 320.

And then, the reference information generation block 350 estimates and analyzes variables and expressions of the source code, types of the expressions, occurrence probabilities of the expressions or the types thereof, and run stream of flows which are frequently executed in the whole of the plurality of source files 120 of the source code based on the use pattern information of the user terminal device 200 and/or the other user terminal devices, to generate a second application profile including profile information for the whole of the source files, and stores the generated second application profile as second reference information in the second storage 320. At this time, the analysis of use pattern information may be performed in a method equal or similar to the analysis of source code.

At this time, alternatively, if the reference information is generated as a plurality of profiles 130' as illustrated in FIG. 4, the reference information generation block 350 may estimate and analyze variables and expressions of the source code, types of the expressions, occurrence probabilities of the expressions or the types thereof, and run stream of flows which are frequently executed in each of the plurality of source files 120 of the source code based on the use pattern information of the user terminal device 200 and/or the other user terminal devices, to generate a plurality of second profiles, each of which includes profile information for each of the source files 120, and store the plurality of generated second profiles as second reference information in the second storage 320.

After that, the reference information generation block 350 combines the first application profile of the first reference information generated from analyzing the source code and the second application profile of the second reference information generated based on the use pattern information to produce a final application profile 130 including unified profile information, and stores the produced final application profile 130 as final reference information in the second storage 320.

At this time, alternatively, if the reference information is generated as a plurality of profiles 130' as illustrated in FIG. 4, the reference information generation block 350 combines the plurality of first profiles of the first reference information generated from analyzing the source code and the plurality of second profiles of the second reference information generated based on the use pattern information to produce a plurality of final profiles 130', each of which includes unified profile information for each of the source files, and stores the plurality of produced final application profiles 130' as final reference information in the second storage 320.

Also, if the use pattern information of the dynamic application and the reference information is preset to be updated at preset time intervals or the user terminal device 200 requests the reference information, the reference information generation block 350 updates and stores the profile information of the application profile 130 (or the plurality of final profiles 130') stored in the second storage 320 in the same manner as described above based on the use pattern information received from the user terminal device 200 and/or the other user terminals.

The reference information provision block 340 and the reference information generation block 350 as described above may be implemented as an ASIC which is designed to embed therein, a compile execution program having corresponding functions.

Alternatively, the reference information provision block 340 and the reference information generation block 350 may be implemented as an execution program having corresponding functions instead of the ASIC. In this case, the execution program is stored in the second storage 320 to be executable by control of the second processor 330.

The second user input receiver 360 and the second display 370 may be configured to have configurations similar to the first user input receiver 230 and the first display 290 of the user terminal device 200. Accordingly, detailed explains thereon will be omitted.

Figure 7:
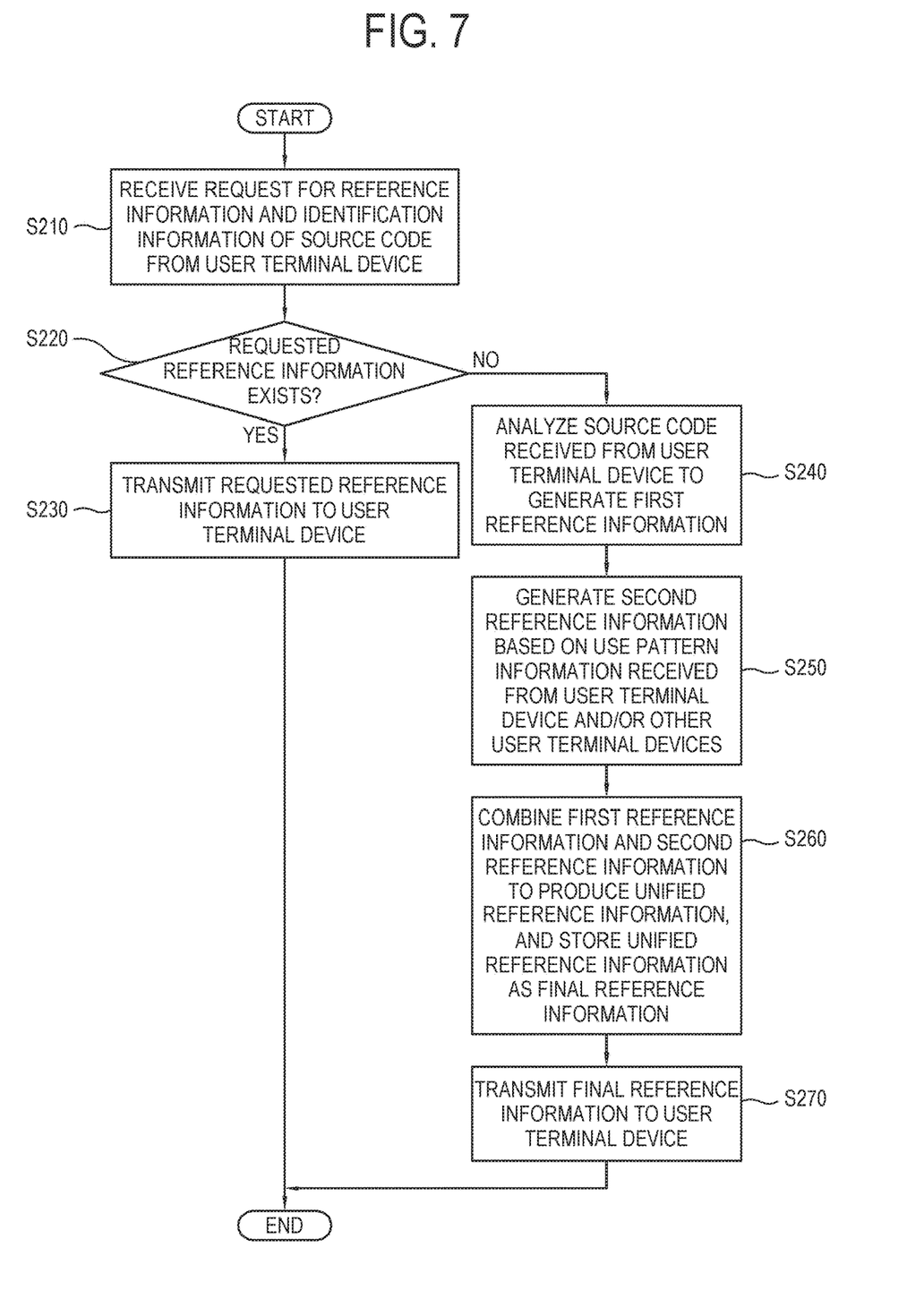
FIG. 7 is a flowchart illustrating an information providing process of the information providing server illustrated in FIG. 1.

Hereinafter, a reference information providing method of the information providing server 300 configured as described above will be explained in detail with reference to FIG. 7.

First, if receiving a request for reference information for compiling a specific dynamic application together identification information for a source code of the specific dynamic application from the user terminal device 200 which has logged in to the information providing server 300 (S210), the second processor 330 of the information providing server 300 identifies whether the requested reference information exists in the second storage 320 based on the received identification information (S220).

As a result of identification at the operation S220, if the requested reference information exists in the second storage 320, the second processor 330 transmits the requested reference information to the user terminal device 200 via the second communicator 310 (S230). At this time, the reference information stored in the second storage 320 may include an application profile 130 including profile information previously generated by analyzing the source code of the specific dynamic application and/or use pattern information of the specific dynamic application of the user terminal device 200 and/or other user terminal devices. At this time, if at the operation S210, the user terminal device 200 transmits the request for reference information right after installing the specific dynamic application, since the user terminal device 200 haven't used the specific dynamic application, use pattern information of the user terminal device 200 is not reflected in the reference information stored in the second storage 320, but only use pattern information of the other user terminal devices may be reflected therein.

As a result of identification at the operation S220, if the reference information corresponding to the specific dynamic application does not exist in the second storage 320, the second processor 330 analyzes the source code of the specific dynamic application received from the user terminal device 200 to generate first reference information, and stores the generated first reference information in the second storage 320 (S240). At this time, the source code may be received from the user terminal device 200, together with the request for reference information or by transmitting a separate request to the user terminal device 200.

In addition, the second processor 330 requests use pattern information to the user terminal device 200 and/or connected other user terminal devices, generates second reference information based on the received use pattern information, and stores the generated second reference information in the second storage 320 (S250). Here, like the source code, the use pattern information may be received from the user terminal device 200, together with the request for reference information or by transmitting a separate request to the user terminal device 200 and/or the connected other user terminal devices.

And then, the second processor 330 combines the first reference information generated from analyzing the source code and the second reference information generated based on the used pattern information to produce unified reference information, and stores the produced unified reference information as final reference information in the second storage 320 (S260).

If as the operation S250, there is no user pattern information received from either the user terminal device 200 or the connected other user terminal devices since the specific dynamic application is first executed in the user terminal device 200 and the connected other user terminal devices, the second processor 330 may not generate any second reference information at the operation S250 thereby not to reflect it in the final reference information. In this case, the final reference information is composed of only the first reference information.

After that, the second processor 330 transmits the final reference information as reference information for compilation to the user terminal device 200 through the second communicator 310 (S270).

Also, if the user pattern information and/or the reference information is set to be updated at preset time intervals or the user terminal device 200 requests the reference information at a preset request time, the second processor 330 updates and stores the profile information of the final reference information stored in the second storage 320 in the same manner as in the operations S240 and S250.

The application executing method of the user terminal device 200 and the information providing method of the information providing server 300 according to the exemplary embodiments as described above may be implemented in a form of program instructions executable through various computer means, which is recordable in a computer readable recording medium. The computer readable recording medium may include program instructions, data files, data structures and so on alone or in combination. The program instructions recorded in the recording medium may be instructions which are specifically designed for the present disclosure or known to one skilled in computer software art to be usable by them.

As described above, according to the user terminal device, the server and the application executing and information providing methods thereof, the user terminal device 200 uses the reference information for compilation generated based on the use pattern information of the other user terminal devices as well as the user terminal device during the compilation, thereby quickly generating the highly efficient and optimized binary execution file.

Also, the user terminal device 200 receives the reference information, which is not the binary execution file compiled into the machine code, from the information providing server 300, and compiles the source code of the dynamic application using the received reference information, thereby resolving the problem that use of the compiled binary execution file is restricted according to used CPUs and the danger, such as viral infection, hacking or the like, which is caused by downloading the compiled binary execution file from the external, as in the related art user terminal device.

Although the present disclosure has been described with various exemplary embodiments, various changes and equivalent modifications may be suggested to one skilled in the art.

The invention claimed is:

1. A user terminal device comprising:
a communicator configured to communicate with at least one server;
a storage; and
a processor configured to:
download a first application among a plurality of applications from an external device to install in the user terminal device;
install the first application in the user terminal device;
identify whether the installed first application is a dynamic application created based on a dynamically typed language;
based on identifying that the installed first application is the dynamic application, identify whether a current time is a preset time for reference information request;
based on identifying that the current time is the preset time, transmit a request for first reference information for compiling a source code of the first application together with identification information of the source code of the first application and at least one of use pattern information of the first application in the user terminal device or second reference information estimated based on the use pattern information, to the at least one server;
receive the first reference information for compiling the source code corresponding to the transmitted identification information from the at least one server, the first reference information being generated using the at least one of the use pattern information or the second reference information;
identify a compiler set for executing the first application;
based on the set compiler being identified to be a first compiler, identify whether the installed first application is executed;
based on identifying that the installed first application is executed, compile the source code of the first application into a machine code using the first compiler based on the received first reference information, to generate an execution file, and execute the execution file generated while compiling the source code of the first application just in time; and
based on the set compiler being identified to be a second compiler, which is different in kind from the first compiler, compile the source code of the first application into the machine code using the second compiler based on the received first reference information to generate the execution file, and store the execution file in the storage,
wherein the preset time comprises at least one of right after the first application is installed, a time designated by a user, upon user's update request, or preset time intervals, which is set via a setting menu according to a user's command, and
wherein the first reference information comprises profile information including at least one of variable type information or execution flow information used in a whole of source files of the source code of the first application, and the second reference information comprises variables of the source code, types of expressions of the source code, occurrence probabilities for the expressions, or run streams of flows of the source code, which are estimated based on the use pattern information.

2. The user terminal device according to claim 1, wherein the processor is configured to further transmit data of the source code of the first application.

3. The user terminal device according to claim 1, wherein the use pattern information comprises an application execution history which comprises variables inputted or selected by a user when the application is executed and functions used when the first application is executed.

4. The user terminal device according to claim 1, wherein the first reference information is produced based on at least one of reference information generated from analyzing the source code of the first application, or second reference information generated based on the use pattern information received from at least one of the user terminal device or other user terminal devices which communicate with the at least one server.

5. The user terminal device according to claim 1, wherein the variable type information comprises variables used in the source code, types of expressions used in the source code and occurrence probabilities for the types of used expressions.

6. The user terminal device according to claim 1, wherein the execution flow information comprises occurrence frequencies of execution flows used in the source code and occurrence frequencies of methods used in the source code.

7. The user terminal device according to claim 1, wherein the processor comprises a just-in-time (JIT) compiler configured to compile the source code of the first application just in time based on the received first reference information during an execution time of the first application.

8. The user terminal device according to claim 1, wherein the processor comprises an ahead-of-time (AOT) compiler configured to compile the source code of the first application in advance based on the received first reference information before executing the first application.

9. The user terminal device according to claim 8, wherein the processor is configured to control the AOT compiler to perform a compile operation at a time where the first application is downloaded and installed, or at an idle time where the user terminal device is not used after installing the first application.

10. The user terminal device according to claim 1, wherein the processor is configured to receive first reference information from a plurality of servers, combine the received first reference information to form unified reference information, and compile the source code of the first application into the machine code using the unified reference information as the first reference information for compiling the source code.

11. A server comprising:
a communicator configured to communicate with a plurality of user terminal devices; and
a processor configured to:
receive a request for first reference information for compiling a source code of a first application among a plurality of applications together with identification information of the source code of the first application and at least one of use pattern information of the first application or second reference information estimated based on the use pattern information, from a first user terminal device from among the plurality of user terminal devices, wherein the first user terminal device is configured to:
  download the first application from an external device to install in the user terminal device,
  install the first application in the user terminal device,
  identify whether the installed first application is a dynamic application created based on a dynamically typed language,
  based on identifying that the installed first application is the dynamic application, identify whether a current time is a preset time for reference information request, and
  based on identifying that the current time is the preset time, transmit the request for reference information together with the identification information and at least one of the use pattern information or the second reference information,
  wherein the preset time comprises at least one of right after the first application is installed, a time designated by a user, upon user's update request, or preset time intervals, which is set via a setting menu according to a user's command, and
  wherein the first reference information comprises profile information including at least one of variable type information or execution flow information used in a whole of source files of the source code of the first application, and the second reference information comprises variables of the source code, types of expressions of the source code, occurrence probabilities for the expressions, or run streams of flows of the source code, which are estimated based on the use pattern information, and
  transmit the first reference information for compiling the source code corresponding to the received identification information to the first user terminal device, to generate an execution file in the first user terminal device, the first reference information being generated using the at least one of the use pattern information or the second reference information,
  wherein the first user terminal device is configured to:
    identify a compiler set for executing the first application,
    based on the set compiler being identified to be a first compiler, identify whether the installed first application is executed,
    using the first compiler based on identifying that the installed first application is executed, compile the source code of the first application into a machine code based on the received first reference information, to generate the execution file, and execute the execution file generated while compiling the source code of the first application just in time, and
    based on the set compiler being identified to be a second compiler, which is different in kind from the first compiler, compile the source code of the first application into the machine code using the second compiler based on the received first reference information to generate the execution file, and store the execution file therein.

12. The server according to claim 11, wherein the processor is configured to further receive data of the source code of the first application.

13. The server according to claim 11, wherein the processor is configured to:
  generate reference information analyzing the source code of the application,
  generate second reference information based on use pattern information received from at least one of the first user terminal device or second user terminal devices which communicate with the server,
  produce first reference information based on at least one of the reference information or the second reference information, and
  transmit the produced first reference information to the first user terminal device.

14. The server according to claim 11, wherein the processor is configured to, in response to the use pattern information of the first application and the first reference information being set to be updated at preset time intervals or the first reference information being requested by the first user terminal device at a preset request time, update the first reference information based on use pattern information received from at least one of the first user terminal device or second user terminal devices which communicate with the server.

* * * * *